United States Patent
Bellman-Greenwood et al.

(10) Patent No.: US 11,709,925 B1
(45) Date of Patent: Jul. 25, 2023

(54) VISUAL TOKEN PASSWORDS

(71) Applicant: Amazon Technologies, Inc., Seattle, WA (US)

(72) Inventors: Tristan Bellman-Greenwood, Lawrence, MA (US); Brian Connolly, Charlestown, MA (US); Zachary Philip Wilson, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 864 days.

(21) Appl. No.: 16/143,798

(22) Filed: Sep. 27, 2018

(51) Int. Cl.
*G06F 21/36* (2013.01)
*G06F 21/62* (2013.01)
*H04L 9/40* (2022.01)

(52) U.S. Cl.
CPC ............ *G06F 21/36* (2013.01); *G06F 21/6218* (2013.01); *H04L 63/083* (2013.01); *H04L 63/102* (2013.01)

(58) Field of Classification Search
CPC .... G06F 21/36; G06F 21/6218; H04L 63/083; H04L 63/102
USPC .......................................................... 726/7
See application file for complete search history.

(56) References Cited

U.S. PATENT DOCUMENTS

| | | | | |
|---|---|---|---|---|
| 5,204,966 A * | 4/1993 | Wittenberg et al. | ..... | G07C 9/33 726/6 |
| 5,697,844 A * | 12/1997 | Von Kohorn | ........ | H04N 7/0806 463/40 |
| 6,720,860 B1* | 4/2004 | Narayanaswami | .... | G06F 21/31 340/5.54 |
| 7,453,438 B2* | 11/2008 | Okamura | ............ | G06F 3/04886 345/156 |
| 8,776,199 B2* | 7/2014 | Paya et al. | ......... | H04N 21/2265 726/28 |
| 8,881,251 B1* | 11/2014 | Hilger | ................. | H04L 63/083 713/183 |
| 10,268,814 B1* | 4/2019 | Barnes | .................. | G06F 21/36 |

(Continued)

FOREIGN PATENT DOCUMENTS

| | | | |
|---|---|---|---|
| CA | 2495450 A1* | 7/2006 | ..................G06F 21/36 |
| JP | 2020052509 A * | 4/2020 | |

OTHER PUBLICATIONS

Almeshekah, Mohammed H., Christopher N. Gutierrez, Mikhail J. Atallah, and Eugene H. Spafford. "Ersatzpasswords: Ending password cracking and detecting password leakage." In Proceedings of the 31st Annual Computer Security Applications Conference, pp. 311-320. 2015. (Year: 2015).*

(Continued)

*Primary Examiner* — Luu T Pham
*Assistant Examiner* — Walter J Malinowski
(74) *Attorney, Agent, or Firm* — Kilpatrick Townsend & Stockton LLP

(57) ABSTRACT

Embodiments herein describe using visual passwords to control access to secure information. When a user attempts to access the secure information, she can provide her username to an authentication agent which identifies the visual password corresponding to the received username and selects a first set of images that contains the visual password and a second set of images that does not. The first and second sets of images are then transmitted to a user device. The user device can display the first and second sets of images to the user who selects which images have the visual password. An indication of which images the user selected is then transmitted to the authentication engine which determines whether the user selected all the images in the first set and none of the images in the second set. If so, the user is granted access to the secure information.

20 Claims, 5 Drawing Sheets

(56) References Cited

U.S. PATENT DOCUMENTS

| | | | | |
|---|---|---|---|---|
| 10,331,873 | B1* | 6/2019 | Meyer | G06F 21/32 |
| 10,339,754 | B1* | 7/2019 | Halvorson | G07F 17/326 |
| 10,540,492 | B1* | 1/2020 | Norris, III | G06F 21/36 |
| 2002/0007105 | A1* | 1/2002 | Prabhu et al. | A61M 21/00 600/26 |
| 2002/0029341 | A1* | 3/2002 | Juels et al. | H04L 9/3236 713/184 |
| 2003/0009469 | A1* | 1/2003 | Platt et al. | G06F 16/58 |
| 2004/0030934 | A1* | 2/2004 | Mizoguchi et al. | G06F 21/36 726/18 |
| 2004/0049734 | A1* | 3/2004 | Simske | G06T 19/00 715/230 |
| 2005/0066180 | A1* | 3/2005 | Watanabe | G06K 9/00067 713/186 |
| 2006/0206918 | A1* | 9/2006 | McLean et al. | G06F 3/0481 726/2 |
| 2006/0291661 | A1* | 12/2006 | Ramzan et al. | H04L 9/0844 380/277 |
| 2007/0198847 | A1* | 8/2007 | Watari | G06F 21/36 713/184 |
| 2007/0277235 | A1* | 11/2007 | Barrett et al. | G06F 21/41 726/12 |
| 2008/0077978 | A1* | 3/2008 | Repasi et al. | G06F 21/36 726/5 |
| 2008/0320310 | A1* | 12/2008 | Florencio et al. | H04L 63/0428 713/184 |
| 2009/0210939 | A1* | 8/2009 | Xu et al. | G06K 9/00154 726/19 |
| 2009/0293110 | A1* | 11/2009 | Koga | G09C 5/00 726/6 |
| 2009/0320124 | A1* | 12/2009 | Taxier et al. | G06F 21/36 726/17 |
| 2010/0004046 | A1* | 1/2010 | Brunelle | G07F 17/3293 463/18 |
| 2010/0180336 | A1* | 7/2010 | Jones et al. | H04L 9/3226 726/19 |
| 2010/0325706 | A1* | 12/2010 | Hachey | G06F 21/36 726/6 |
| 2012/0144458 | A1* | 6/2012 | Mechaley, Jr. | G06F 21/43 726/5 |
| 2013/0097697 | A1* | 4/2013 | Zhu et al. | H04L 63/083 726/18 |
| 2013/0232549 | A1* | 9/2013 | Hawkes | H04L 63/08 726/3 |
| 2014/0301652 | A1* | 10/2014 | Mese et al. | G06F 9/46 382/218 |
| 2015/0121489 | A1* | 4/2015 | Yang et al. | G06F 21/46 726/6 |
| 2015/0169643 | A1* | 6/2015 | Kogan et al. | G06F 16/532 707/748 |
| 2015/0178490 | A1* | 6/2015 | Tamboly et al. | G06F 21/46 726/4 |
| 2015/0301724 | A1* | 10/2015 | Thibadeau, Sr. et al. | G06F 3/0488 706/12 |
| 2015/0310309 | A1* | 10/2015 | Gopalan et al. | G06F 18/22 382/199 |
| 2016/0283708 | A1* | 9/2016 | Getchius et al. | G06F 21/36 |
| 2016/0300125 | A1* | 10/2016 | Barker | G06T 7/0004 |
| 2016/0335483 | A1* | 11/2016 | Pfursich et al. | G06K 9/00899 |
| 2017/0147959 | A1* | 5/2017 | Sweeney et al. | G07C 5/008 |
| 2017/0161477 | A1* | 6/2017 | Liu et al. | H04L 63/12 |
| 2017/0161480 | A1* | 6/2017 | Jo | G06F 21/32 |
| 2017/0213074 | A1* | 7/2017 | Lee et al. | G06K 9/00281 |
| 2017/0300686 | A1* | 10/2017 | Shyu et al. | G06K 9/00604 |
| 2018/0032714 | A1* | 2/2018 | Zia | G06F 21/46 |
| 2018/0041654 | A1* | 2/2018 | Yamaki | G06K 9/00288 |
| 2018/0048635 | A1* | 2/2018 | Thibadeau, Sr. et al. | H04L 63/10 |
| 2018/0061459 | A1* | 3/2018 | Song et al. | H04N 21/4316 |
| 2018/0101934 | A1* | 4/2018 | Cai et al. | G06T 7/174 |
| 2018/0121049 | A1* | 5/2018 | Park et al. | G06F 3/0485 |
| 2019/0050554 | A1* | 2/2019 | Fiske | G06F 21/128 |
| 2019/0057199 | A1* | 2/2019 | Hutchinson | H04W 12/06 |
| 2019/0065900 | A1* | 2/2019 | Nishino et al. | G06T 7/277 |
| 2019/0073870 | A1* | 3/2019 | Penacho et al. | G07F 17/3225 |
| 2019/0246000 | A1* | 8/2019 | Cheng et al. | H04N 1/193 |
| 2020/0012776 | A1* | 1/2020 | Deluca et al. | G06F 21/316 |

OTHER PUBLICATIONS

Hajjdiab, H. et al. "Random Image Matching CAPTCHA System", Electronic Letters on Computer Vision and Image Analysis, 16(3): 1-13, 2017, received Dec.19, 2016, accepted Jul. 23, 2017 <https://ddd.uab.cat/pub/elcvia/elcvia_a2017v16n3/elcvia_a2017v16n3p1.pdf>.

Patil, Nayansukh, and Rachana Patil. "Achieving Flatness: with Video Captcha, Location Tracking, Selecting the Honeywords." In 2018 International Conference on Smart City and Emerging Technology (ICSCET), pp. 1-6. IEEE, 2018. (Year: 2018).*

Weidenbeck, Susan, Jim Waters, Jean Camille Birget, Alex Brodskiy, and Nasir Memon. "Authentication using graphical passwords: Basic results." Proc. Human-Computer Interaction International (HCII) (2005). (Year: 2006).*

Vuksanovic, Branislav, and Haitham Al-Sinani. "Two proposals for improving the image-based authentication system: H-IBAS-H." In 2009 First International Conference on Evolving Internet, pp. 168-171. IEEE, 2009. (Year: 2009).*

Hern, Alex, "How the internet found a better way than illegible squiggles to prove you're not a robot", Mar. 13, 2017, The Guardian Weekly © 2018 Guardian News and Media Limited, Sep. 20, 2018, 3 pages. <https://www.theguardian.com/technology/2017/mar/13/captcha-prove-not-a-robot-internet>.

* cited by examiner

VISUAL TOKEN PASSWORDS

BACKGROUND

The present invention relates to visual token passwords, and more specifically, to assigning displayable features in images to a username for accessing secure information.

A username and a corresponding password are often used to control access to secure electronic information (e.g., access to websites, accounts, virtual private networks, sensitive employee database, etc.). For example, before being permitted to electronically access a bank account, the user must first provide a username for the account and the assigned password. The username and password are transmitted to an authentication agent which then grants or denies access to a webpage displaying information about the bank account.

However, passwords that contain text - e.g., a letters, numbers, symbols, etc. - are difficult to memorize. Further, many entities have different standards required for their passwords such as the password must contain at least one capital letter, a number, and a special symbol. The differing requirements may mean a user has to memorize multiple complicated passwords. The user may be forced to write down the passwords, or save them in a digital file, which can expose the passwords to a nefarious actor.

DETAILED DESCRIPTION

Embodiments herein describe using visual passwords to control access to secure information. Instead of a password containing text which can be typed, the visual password can be a displayable feature in an image such as a shape, building, animal, plant, symbol, person, or any other real or made-up object. This visual password is assigned to a particular username. For example, when a user opens an account, the user can select both her username and the visual password (or have these assigned to her). Later, when attempting to log into the account, the user can provide her username to an authentication agent. The authentication agent then identifies the visual password corresponding to the received username and identifies a first set of images that contain the visual password and a second set of images that do not. The first and second sets of images are then transmitted to a user device.

The user device displays the first and second sets of images to the user who selects images having the visual password. An indication of which images the user selected is then transmitted to the authentication engine which determines whether the user selected all the images in the first set and none of the images in the second set. If so, the user is granted access to the secure information. One advantage of using a visual password is that the password never needs to be transmitted between the authentication server and the user device. That is, with passwords that contain text, the password is typically transmitted from the user device to the authentication agent each time the user logs in to her account. However, with visual passwords, once the user selects a password, the user does not select, or identify, the visual password directly but selects an image that contains the visual password (as well as potentially hundreds or thousands of other visual features). Thus, the visual password does not need to be transmitted through public network to gain access to user account, thereby providing greater security for computing systems. Moreover, visual passwords can be much easier to memorize relative to complicated passwords that can be a mix of text, numbers, and symbols.

Figure 1:
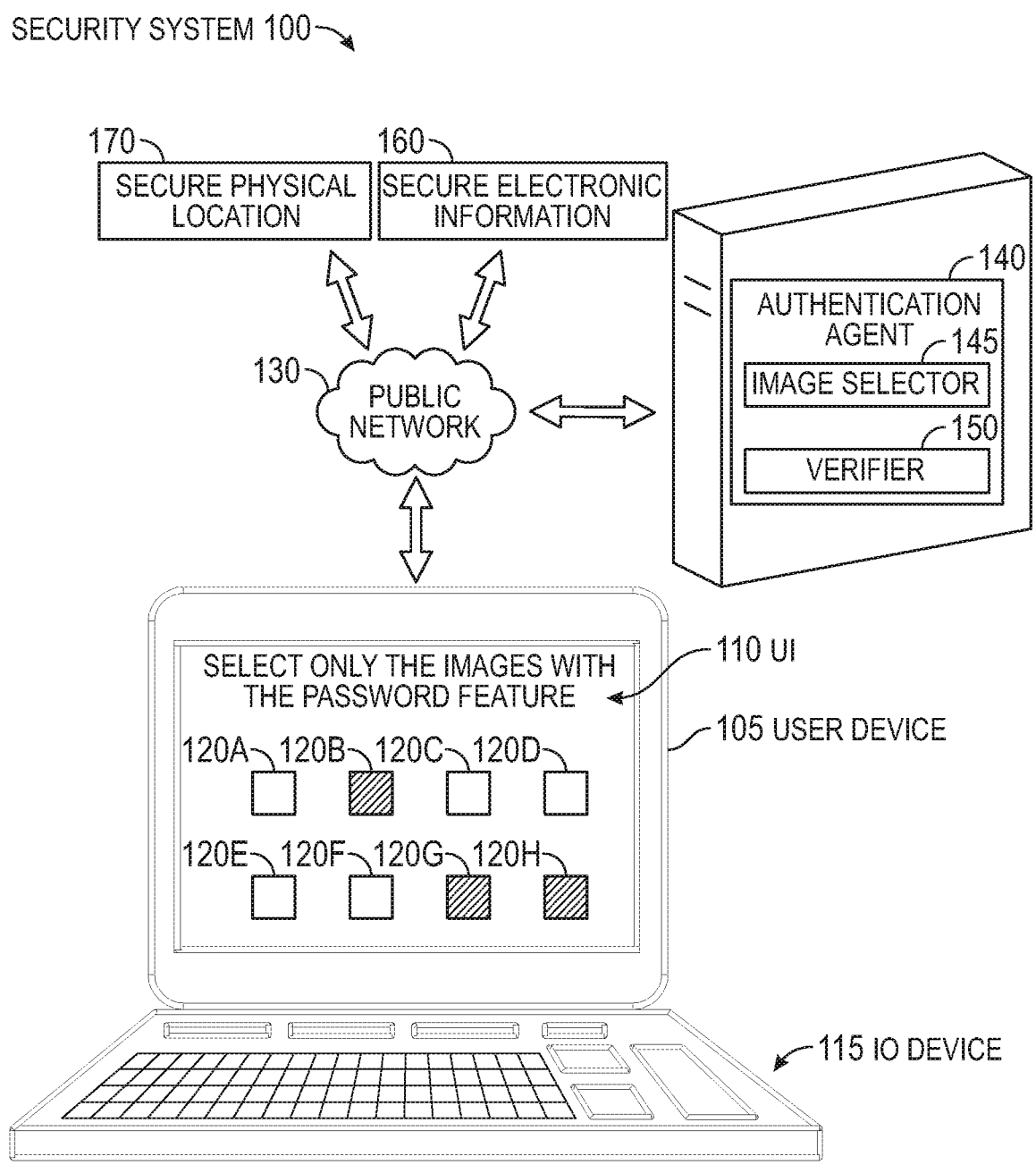
FIG. 1 illustrates a system that uses visual passwords to access secure information, according to various embodiments.

FIG. 1 illustrates a security system 100 that uses visual passwords to access secure information, according to various embodiments. The security system 100 includes an authentication agent 140, a user device 105, and a public network 130 (e.g., the Internet) which communicative couples the authentication agent 140 to the user device 105. The authentication agent 140 includes an image selector 145 and a verifier 150. The image selector 145 identifies, based on a username provided by the user, a visual password assigned to that username. The image selector 145 then determines what images to transmit to the user device 105 to test whether the user knows the visual password.

The user device 105 includes a user interface (UI) 110 which displays images 120 received from the authentication agent 140. The user then selects using an input/output (IO) device 115 (e.g., a touch screen, mouse, touchpad, stylus, eye-tracking system, keyboard, etc.) which of the images 120 contain the visual password. In FIG. 1, the hashing illustrates the images 120 selected by the user - i.e., the images 120B, 120G, and 120H. That is, the user views the images displayed in the UI 110 and then selects using the IO device 115 which of the images 120 have the visual password.

The user device 105 sends the selected images 120B, 120G, and 120H (or an indication of the selected images) to the authentication agent 140 which includes a verifier 150 for determining whether the user has selected the correct images. Put differently, the verifier 150 determines whether the user selected all the images that contained the visual password and did not select any of the images that did not contain the visual password. If so, the verifier 150 permits the user device 105 to access the secure information protected by the username and password. For example, the security system 100 may be use to access secure electronic information 160 such as accessing a secure website, accessing an electronic account, retrieving information from a secure database, or receiving a key for decrypting data stored on the user device 105.

The security system 100 can also be used to permit the user to access a secure physical location 170. For example, the user device 105 may be portable electronic device (e.g., a table or smartphone) which can be used to grant the user access to a secure building or enclosure. For example, when reaching a locked door (or a locked mailbox), the user can inform the authentication agent 140 the location she is at and her username. In turn, the image selector 145 provides the images 120 to the user device 105 which the user can then select. If the user selects the correct images 120, the verifier 150 transmits an instruction that unlocks the locked door or mailbox which permits the user access to the secure physical location 170. In this manner, the security system 100 can be used to grant user access to both secure electronic information 160 as well as secure physical locations 170.

Figure 2:
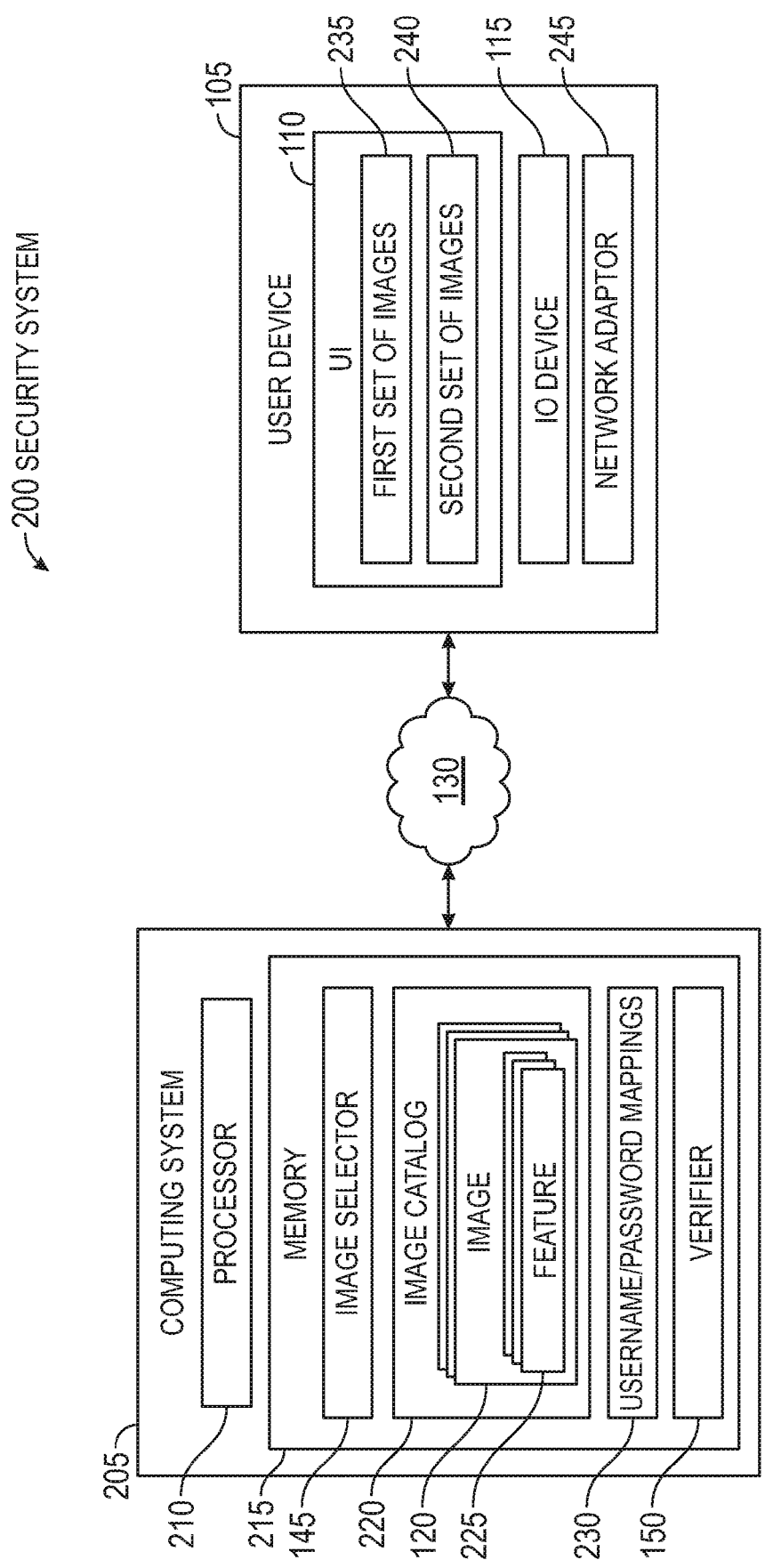
FIG. 2 illustrates a computing system for generating images containing visual passwords, according to various embodiments.

FIG. 2 illustrates a security system 200 for generating images containing visual passwords, according to various embodiments. The system 200 includes a computing system 205 that is communicatively coupled to a user device 105 via the network 130. The computing system 205 represents one or more computing devices that each include one or more processors 210 and memory 215. For example, the processors 210 can include any number of processing elements or cores. Further, the memory 215 can include volatile and non-volatile storage devices. In one embodiment, the computing system 205 can be hosted in a cloud computing environment.

The memory 215 stores the image selector 145, an image catalog 220, username/password mappings 230, and the verifier 150. In one embodiment, the image selector 145 uses the images 120 stored in the image catalog 220 to determine which images to transmit to the user device 105. For example, the images 120 may have already been processed to identify features 225 within those images 120. In one embodiment, the computing system 205 (or a separate computing system) hosts an image processing system which performs image processing to identify the various features in the images 120 (e.g., shapes, buildings, animals, plants, symbols, famous people, etc.). For example, the image processing system may receive real-world images, process the images to identify the various identifiable features in the image, and the store the images 120 and their corresponding features 225 in the image catalog 220. In another example, the images 120 may be submitted to users as part of a crowd sourcing project. The users identify the features 225 in the images 120. In any case, the image catalog 220 can store millions of different real-world images 120 which each can have any number of features 225.

In another embodiment, the computing system 205 generates the images. For example, when a username is received, the computing system 205 may generate the images 120 which are then displayed on the user device 105. As described in more detail below, the computing system 205 can customize the images in response to the visual password associated with the username, or for the needs of the user (e.g., if the user is visually impaired). Thus, the images 120 can be images of real-world environments, images of real-world objects (e.g., paintings or other artwork), or computer generated images. The image catalog 220 stores a list of the features 225 (however generated) in each of the images 120 which the image selector 145 can use to determine which of the images 120 to send to the user device 105 to test the user.

The username/password mappings 230 store an association between the username of a user and the visual password. In one embodiment, each username is assigned at least one visual password. However, in other embodiments, a username may be assigned different visual passwords which may improve security. For example, a user may have to select all the images that have two visual passwords (e.g., a red triangle and a purple circle). Thus, a nefarious actor must know both of the visual passwords to gain access to the secure information. Memorizing two visual passwords may be easier for a user than memorizing two complicated text passwords.

After receiving a username, the image selector 145 uses the username/password mappings 230 to identify the visual password or passwords corresponding to that username. The image selector 145 can then identify a number of images 120 to send user device 105 where some of the images 120 have the visual password but others do not.

The user device 105 includes the UI 110, the IO device 115, and a network adapter 245. The user device 105 can be a desktop computer, a laptop, tablet, or smartphone. In another example, the user device 105 can be part of (or in communication with) a locking mechanism for an access point into a secure location. For example, a touch sensitive display screen in the user device 105 may be mounted on a wall near the access point. When attempting to gain access to the secure location, the user can use the UI 110 displayed on the touch sensitive display screen to provide a username and select which images 120 contain the corresponding visual password. If the verifier 150 determines the user selected the correct images, the verifier 150 can instruct the user device 105 to unlock the locking mechanism thereby permitting the user access to the secure location.

As shown in FIG. 2, the UI 110 displays a first set of images 235 and a second set of images 240. The first set of images 235 refer to the images selected by the image selector 145 that have the visual password, while the second set of images 240 is selected so its images do not have the visual password. While the image selector 145 may occasional transmit images 120 to the user device 105 which all have the visual password, doing so all the time would reduce the effectiveness of using the visual password. In one embodiment, the image selector 145 may use a random number generator to determine how many images should be in the first set of images 235 and how many should be in the second set of images 240. Thus, each time a user is tested, the user may have to select a random number of images to be granted access.

The network adapter 245 enables the user device 105 to communicate with the network 130 and eventually to the computing system 205. If the user device 105 is a portable device, the network adapter 245 may be a wireless communication interface that permits the user device 105 to communicate with a Wi-Fi or cell network. In other embodiments, the network adapter 245 is a wired communication network that use, e.g., Ethernet to communicate with a local area network (LAN).

Figure 3:
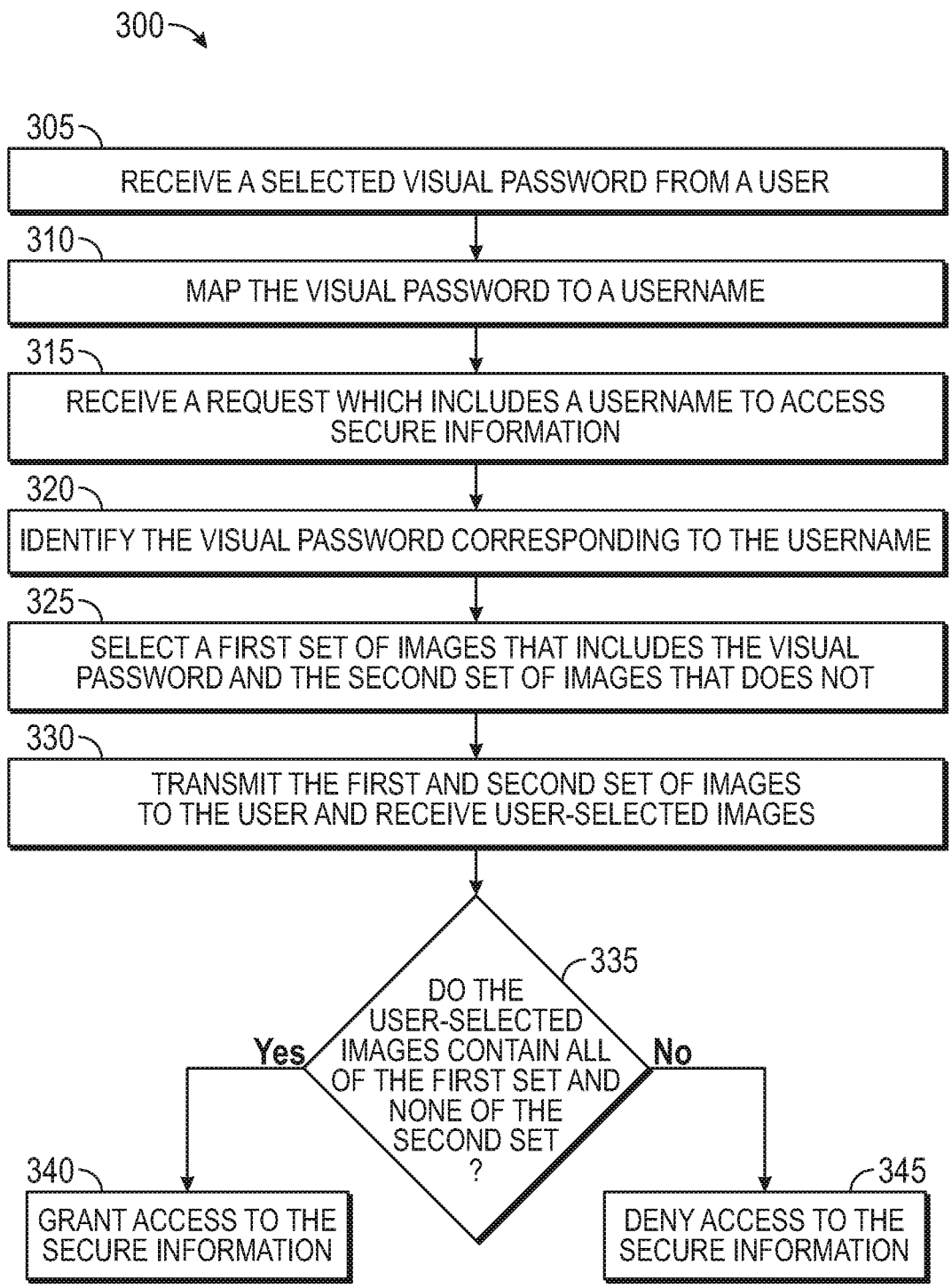
FIG. 3 is a flowchart for controlling access to secure information using a visual password, according to various embodiments.

FIG. 3 is a flowchart of a method 300 for controlling access to secure information using a visual password, according to various embodiments. At block 305, the authentication agent receives a selected visual password from a user. In one embodiment, the authentication agent transmits a list (using text or images) of visual features which the user can choose from to select her desired visual password. For example, the authentication agent may send a list of the features that are stored in the image catalog to the user. In one embodiment, the authentication agent sends to the user a list of features that have already been identified in the images stored in the catalog, or a list of features that the authentication agent can make when generating its own images to test the user.

In one embodiment, the authentication agent does not send the complete list of features it has identified (or that it can use when generating its own images) to the user. The complete list may include millions or billions of features which may overwhelm the user. Further, sending the complete list may reduce the security of the system. That is, sending the complete list of features to a user creating an account exposes the list to nefarious actors. If these actors know the total list of features that the security system uses as visual passwords, this means the nefarious actors have to look for only those features when trying to guess a user's visual password. As such, the authentication agent may send a small random subset of the total features (e.g., ten or twenty features) to a user to select as her visual password.

In one embodiment, the authentication agent may ask the user what type of feature she would like for her password. In this example, the authentication agent may first send to the user a list of different categories or types of features (e.g., shapes, buildings, symbols, animals, plants, etc.). Once the user selects a category, the authentication agent sends a random list of ten or twenty features in that category to the user. In another example, the user may submit a specific feature she wants to use as her visual password - e.g., her favorite animal, shape, or food. The authentication agent can search its list of features and see if it has a match, and if so, inform the user.

In one embodiment, the authentication agent adds a feature to the list of available features that can be used as a visual password only if the image catalog has a minimum number of images with that feature. For example, if the image catalog only has two images with a certain feature, the authentication agent may not permit the user to select that feature as her password since, when testing the user later in method 300, there are only two images that can be used which means those images would be repeated each time the user logs in. This makes it easier for a nefarious actor to identify the visual password of the user. Instead, the authentication agent may wait until it has, e.g., a hundred images in its image catalog with the feature before that feature is available to be used as a visual password.

At block 310, the authentication agent maps the visual password selected by the user to a username. For example, when selecting the visual password from the list of features provided by the authentication agent, the user can also provide a username. Although the username and visual password can be selected by the user, in other embodiments, one or both of the username and visual password can be assigned to the user by the authentication agent. For example, when signing up for an account, the user may be able to provide a username, but the authentication server automatically assigns the visual password.

While blocks 305 and 310 may be performed only once by the user to establish her username and visual password, the remaining blocks in the method 300 may be repeated each time the user wants to access the secure information (or a secure location). For example, the blocks 315-345 may be repeated each time the user attempts to log into her bank account or access a secure database.

At block 315, the authentication agent receives a request, which includes a username, to access secure information. That is, the user transmits a request to the authentication agent to access a website, an electronic account, download secure data, upload data, encrypt data, or the like. When submitting the request, the user (or the user device) can provide the username to the authentication agent. For example, the user device can include a user interface (e.g., a keyboard or a touch pad) that enables the user to type in her username. In another example, the username may be saved on the user device so that anytime the user goes to a log in page for accessing the secure location, the username is automatically populated or automatically transmitted to the authentication agent.

At block 320, the authentication agent identifies the visual password corresponding to the username. In one embodiment, the authentication agent uses the username received at block 315 to index into the username/password mappings to identify the visual password corresponding to the username. As mentioned above, each username can be associated with one or more visual passwords.

At block 325, the image selector in the authentication agent selects a first set of images that includes the visual password and a second set of images that does not include the visual password. In one embodiment, the image selector uses the visual password to identify all the images in the image catalog 220 that has that feature. Stated differently, because the visual password is one of the features 225, the image selector can use the visual password to identify which of the images 120 in the image catalog 220 contain the visual password and which do not.

In one embodiment, the image selector uses a random number generator to determine how many images are in the first set and second set. For example, if the image selector sends ten images each time a user attempts to log in, the image selector can use the random number generator to determine how many images should be in the first set with the remaining images being used to populate the second set. However, in one embodiment, the random number used to dictate the size of the first set may be greater than one to prevent the image selector from sending no images containing the visual password to the user which may be it easier to gain access to the user's account (since a nefarious actor can just select none of the images and hope the first set had a zero value) and may confuse the user if she does not see the visual password in any of the images. Similarly, the second set may range from 1-9 in that example so that the test images do not include only images that have the visual password. That way, a nefarious actor can just select all of the images and hope the second set had a zero value.

In one embodiment, the image selector also changes the total number of images sent to the user in the first and second sets. For example, each time the user attempts to log in, the image selector may send a different number of images to test the user. In this manner, not only can the size of the first and second sets change, but the image selector can also randomly (or methodically) change the total number of images in the first and second sets. Additional details and techniques for selecting the images in the first and second sets are described later with respect to FIG. 4.

At block 330, the image selector transmits the first and second sets of images to the user and receives user-selected images. When transmitting the first and second sets, the image selector may arrange the images in a random order. For example, each image in the first and second sets may be equally weighted and assigned in a random order. Moreover, the images may not have any special marking or metadata attached that might indicate which images are part of the first set (e.g., images that contain the visual password) and which are part of the second set (which do not have the visual password). Thus, only the authentication agent knows which images are in which group. As such, if the images are intercepted by a nefarious actor when being transmitted to the user device, or a nefarious actor has discovered the user's username and is attempting to log into her account, the images do not contain any information which would indicate whether they have the visual password for the user.

In one embodiment, the data representing the images is encrypted when being sent from the authentication agent to the user device. Doing so may reduce the chance that a nefarious actor can view the images if the images are intercepted when traveling on a public network. However, in other embodiments, the images can be transmitted using unencrypted data. Thus, unlike authentication systems that rely on text passwords which must be encrypted, here the visual password is never directly transmitted in the network which means the images do not have to be encrypted when being transmitted to and from the user device.

The UI on the user device permits the user to select which of the displayed images include the visual password. In one embodiment, the user leaves the displayed images that do not include the visual password unselected - i.e., the images in the second set. For example, the UI may display all the images received from the user (in a random order) at once. In another example, the UI may display only one image, or a subset of the images, at a time. The user may select the image by clicking or touching the image in the UI or by interacting with a button next to each displayed image. For example, each image may have two buttons -one button indicating the image has the visual password and another button indicating the image does not include the visual password. The user can press a "submit" button to indicate she has reviewed all the images and selected the ones she believes have the visual password.

In response, the user device transmits an indication of the user-selected images to the authentication agent. For example, when populating the first and second sets, the image selection may assign an ID or label (e.g., a random number) to each of the images. The user device can transmit the IDs of the images, which can be encrypted, selected by the user to the authentication server. Alternatively, the user device may transmit the user-selected images (rather than just an ID or label) back to the authentication agent, but delete the images that were not selected by the user. In this manner, the user device can inform the authentication agent which of the images were indicated by the user as containing the visual password.

One potential advantage of transmitting an indication of the user-selected images rather the images themselves back to the authentication agent is to improve security. For example, if a nefarious actor intercepted the IDs of the user-selected images being transmitted by the user device but never intercepted the original images that were transmitted by the authentication agent, the nefarious actor does not have any of the images, and thus, cannot process the user-selected images to attempt to identify the visual password.

In one embodiment, the UI blacks out or removes the images selected by the user. For example, as the user selects an image, the UI stops displaying the selected image. Thus, if a nefarious actor is looking over the shoulder of the user, the actor cannot view the selected image to try to determine the visual password. As the user continues to select the first set of images, the UI can continue to black out or remove the selected images so the nefarious actor cannot compare the selected images and attempt to identify a common feature which may be the visual password. In another example, the UI may display the images in sub-groups to reduce the ability of a nefarious actor to compare the selected images. For example, the authentication agent may send twelve images that the UI displays in three groups of four. Because the first set of images may be dispersed among the three groups, the nefarious actor does not see all of the selected images displayed at the same time on the UI. This makes it difficult for the nefarious actor to compare the features in the selected images to identify a common feature which may be the visual password.

At block 335, the verifier in the authentication agent determines whether the user-selected images contain all of the first set and none of the second set. That is, the verifier determines whether the user selected all of the images that contained the visual password and none of the images that did not include the visual password.

If so, the method 300 proceeds to block 340 where the verifier grants access to the secure information. For example, the user may then be re-routed to a secure website or gain access to her account. In another example, the authentication agent may send a key or security token to the user device which can be used to gain access to a website or decrypt encrypted data. Further, rather than granting access to electronic information, the verifier may grant access to a physical location such as opening a door to an apartment complex or open a mailbox so the user can retrieve a package or other types of mail.

While block 335 illustrates granting access to the secure location if the user-selected images contain all of the first set, in another embodiment, the verifier may grant access if the user-selected images contain at least a predefined minimum threshold of the images in the first set (e.g., more than 80%) and none of the second set. For example, the user may miss one or two of the images in the first set (e.g., fail to see the visual password in those images) and still be permitted access. That is, the user may have selected enough of the images in the first set and did not select any of the images in the second set to prove she knows the visual password.

However, if the user either does not select all of the images (or a predefined minimum number of the images) that contain the visual password or selects an image that does not contain the visual password, the method 300 proceeds to block 345 where the verifier denies access to the secure information (or to the physical location). In one embodiment, the authentication agent may repeat blocks 325-335 one or more times to give the user several opportunities to gain access to the secure information. However, if the user continues to fail to pass the test at block 335, the authentication agent may stop repeating the method 300 and may block the user device for a period of time, or disable the virtual password which may result in the user having to repeat block 305 to select a new virtual password and/or username.

Figure 4:
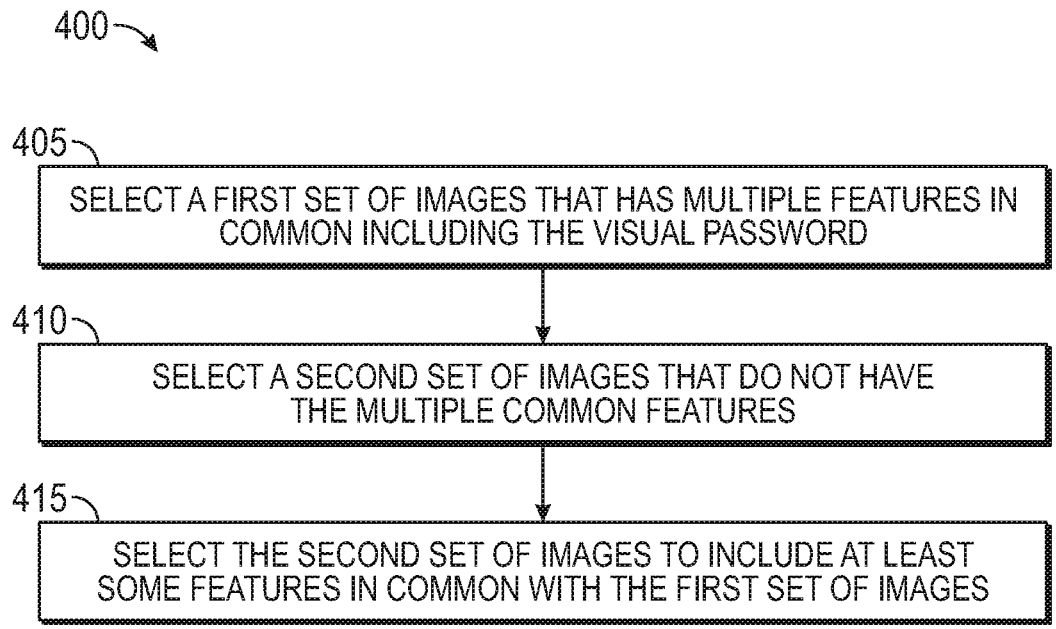
FIG. 4 is a flowchart for generating images that test whether a user knows the visual password, according to various embodiments.

FIG. 4 is a flowchart of a method 400 for generating images that test whether a user knows the visual password, according to various embodiments. The method 400 describes various techniques for selecting the first and second sets of images as described in block 325 of the method 300.

At block 405, the image selector selects a first set of images that has multiple features in common including the password feature. In one embodiment, the image selector parses through the image catalog to identify the images that contain the visual password. The image selector can also cross reference these images to determine whether they have additional features in common. For example, the image selector may identify a set of images that all have the visual password as well as at least four other features (e.g., a predefined minimum threshold) in common. Thus, if a nefarious actor is looking over the user's shoulder, or someone learns which of the images the user selected, there is not just one feature that the images have in common, thus make it more difficult for the nefarious actor to ascertain the visual password.

Figure 5:
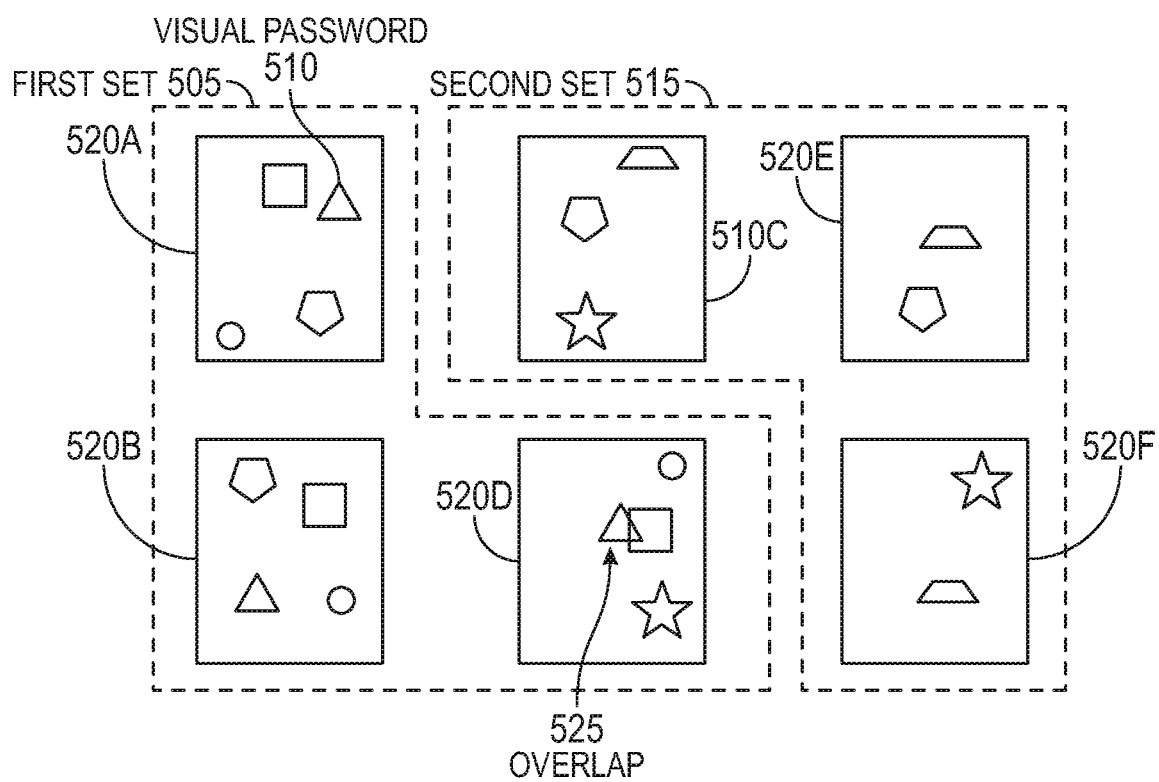
FIG. 5 illustrates displaying test images for user selection, according to various embodiments.

In an embodiment where the authentication agent generates the images presented to the user (rather than using previously catalogued images), when doing so, the agent can ensure the images in the first set have a predefined minimum threshold of features in common which is illustrated in FIG. 5.

FIG. 5 illustrates displaying test images 520 for user selection, according to various embodiments. For example, the test images 520 may be computer generated images but the same techniques can also be applied to real-world images where their features have been identified and indexed into a catalog.

A first set 505 of test images - i.e., images 520A, 520B, and 520D — contain a visual password 510 (a triangle in this example), while a second set 515 of the images — i.e., images 520C, 520E, and 520F — do not contain the visual password 510. In addition to the visual password 510, the first set 505 also includes other common features — e.g., a rectangle and a circle. Thus, if a nefarious actor saw the user select the first set 505 of images, it would not be readily apparent which one of the common features (e.g., the triangle, square, or circle) is the visual password. While the example in FIG. 5 illustrates having three common features (including the visual password) in common with the first set 505, in practice the authentication images may select images for the first set 505 which have tens or hundreds of common features.

Returning to the method 400, at block 410, the image selector selects a second set of images that do not have the multiple common features. Put differently, in addition to ensuring that the second set of images do not contain the visual password, in this example, the image selector ensures the second set of images also does not contain at least some of the common features identified at block 405. This is again illustrated in FIG. 5 where the common features in the first set 505 (e.g., the triangle, square, or circle) are not in the second set 515.

Doing so may increase security since a nefarious actor cannot rule out which features are not the visual password by comparing the features in the user selected set (e.g., the first set 505) with the features of the images in the second set 515. Put differently, if the nefarious actor somehow learns which images the user selected and which she did not, the nefarious actor could eliminate some of the features in the first set 505 from being the visual password by determining whether those features are in the second set 515. Any feature that is in both the first set 505 and the second set 515 cannot be the visual password. Thus, ensuring there are multiple common features that are in the first set 505 but not in the second set 515 can improve security by ensuring the nefarious actor cannot simply compare the images in the two sets and use a process of elimination to identify the visual password.

Returning to the method 400, at block 415, the image selector selects the second set of images to include at least some features in common with the first set of images. Thus, while block 410 ensures that there is a plurality of features that is only in the first set of images, block 415 ensures there are also one or more features that are common to both the first and second sets of images. Thus, if a nefarious actor intercepts the images, the actor cannot visually (or by the use of an image processing system) easily identify the first set of images from the second set of images.

For example, FIG. 5 illustrates that the images in the first set 505 and the second set 515 include several common features. For instance, the images 520B and 520C both include a pentagon and images 520C, 520D, and 520F include a star. Thus, a nefarious actor cannot look at the images 520 and easily determine which images may be in the first set and which are in the second set based on those sets have mutually exclusive features. Further, it may be advantageous to select images in the second set to include a feature that is common only to the second set 515 (e.g., the trapezoid) but not found in the first set 505 of images.

In addition, FIG. 5 illustrates that the image selector may dispose the features on top of each other as shown by the overlap 525. That is, when generating the image 520D, the image selector may purposefully dispose the triangle over the square. Doing so may make it harder for an image processing system used by a nefarious actor to identify the various features in the images 520, thereby making the authentication system more secure.

Although FIG. 5 illustrates using shapes as the features, this is merely one example. The techniques described above can apply to other types of features (buildings, animals, plants, symbols, famous people, etc.). Further, the visual password may have an assigned color. For example, the user may select a red triangle as the visual password. In that case, a user should not select an image if it contained a blue triangle, but not a red triangle. Stated differently, any image that does not have a red triangle would be part of the second set of images. Assigning a particular color to a visual password may further improve the security of the authentication system.

In other embodiments, the security of the authentication system may be improved by reducing the number of images, which may make it easier to ensure the images have a lot of common features. Doing so makes it harder for a nefarious actor to compare the images to identify the visual password. Further, the image selector may rotate through the images. For example, the image selector may ensure the same images from the catalog are not constantly selected to test a particular username. The image selector may maintain a history of which images are used to test which username and ensure that the same images are not used too frequently.

Figure 6:
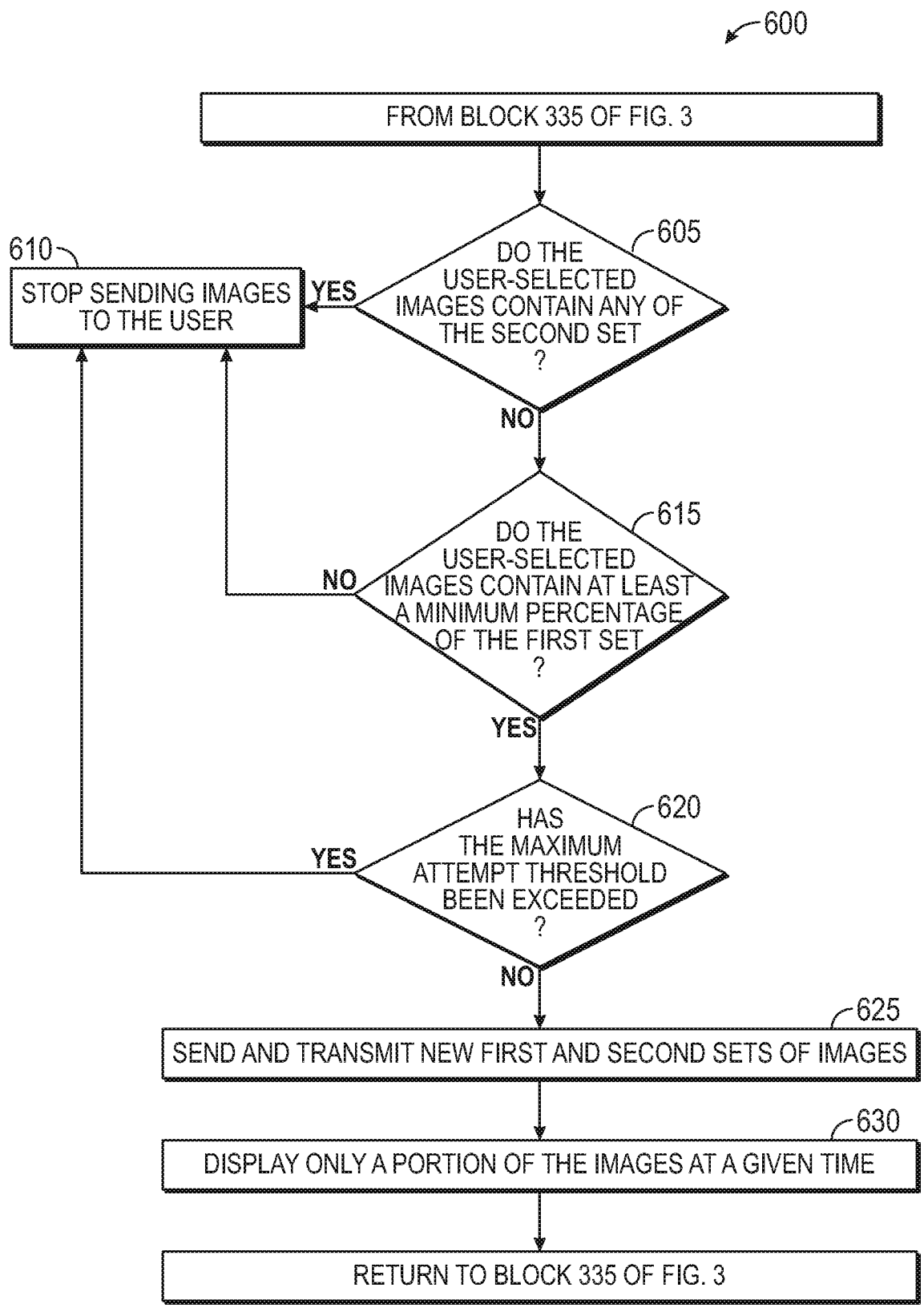
FIG. 6 is a flowchart for providing a user with a second chance after selecting the wrong test images, according to various embodiments.

FIG. 6 is a flowchart of a method 600 for providing a user with a second chance after selecting the wrong test images, according to various embodiments. The method 600 begins after block 335 of FIG. 3 where the verifier has determined that the user failed to select all of the images in the first set and none of the images in the second set. While FIG. 3 illustrates denying the user access to the secure information at block 345, the method 600 provides various techniques where a user can be given additional chances to select the correct images.

At block 605, the verifier determines whether the user-selected images contain any of the second set. Put differently, the verifier determines whether the user selected any images that do not include the visual password which may indicate that the user is a nefarious actor who is attempting the guess the visual password. If so, the method 600 proceeds to block 610 where the authentication agent stops sending images to the user. In other words, the user is not given a second chance to select images which contain the visual password. However, in another embodiment, the verifier may always give the user at least one second change to select the images before proceeding to block 610, or the verifier may proceed to block 610 only if the user selects a certain percentage of the images in the second set (e.g., more than 20%).

Rather than being a nefarious actor, the user may have missed the visual password in one of the images. For example, the user may be visually impaired or is not currently wearing prescription glasses, and thus, has difficultly identifying the visual password in the images. As such, the verifier may want to give the user another chance if the user did not select any incorrect images (or selected less than a threshold amount of the second set of images) but did not select all of the images that contained the visual password. In this case, the method 600 proceeds to block 615.

At block 615, the verifier determines whether the user-selected images contain at least a minimum percentage of the first set. The minimum percentage can be customizable by a system administrator of the authentication system. For example, the verifier may check whether the user selected at least 80% of the images that contained the visual password. If so, the method 600 proceeds to block 620, but if not the method proceeds to block 610.

At block 620, the verifier determines whether the user device has exceeded a maximum attempt threshold. In one embodiment, the verifier tracks the number of requests submitted by the user device (e.g., by tracking a unique identifier for the user device such as a source IP address) or the number of times a log in was attempted using the same username. If the user device has attempted to log in more than the maximum threshold, the method proceeds to block 610. The authentication agent may then lock out the user device (e.g., ignore future requests from the user device) or the username for a predefined time period (e.g., ten minutes). The authentication agent may also freeze the account and send an email or text message to the user to indicate the account has been frozen. The user (as well as any nefarious actors) is locked out of the account until the user unlocks the account or selects another visual password.

However, assuming the maximum threshold has not been exceeded, at block 625 the image selector selects and transmits new first and second sets of images. That is, the image selector may repeat the techniques described above in method 300 and 400 to select new test images for the user. These test images may include all unique images or include some images from the previous batch of test images sent to the user. Further, the image selector may send a different number of total images or change the number of images in the first and second sets relative to the first and second sets sent previously.

At block 630, the user device displays only a portion of the images at a given time. That is, the user device may display the current test images differently than the test images sent previously. For example, when the user first attempts to log in, the user device may display multiple images simultaneously (e.g., all the images at the same time, or a group of two or three images each time). However, at block 630, the user device may display each image separately which may mean the image can be much larger (since the display is not shared with other images). Displaying larger images after the user has failed to log in correctly may make it easier for a visually impaired user to identify which images have the visual password and which do not. In this manner, the authentication system can adjust the manner it displays the images to accommodate a visual impaired user or a user device with a smaller screen.

The method 600 then proceeds to block 335 to determine whether the user correctly selected all the images in the first set and none of the images in the second set. If yes, the verifier can grant the user access to the secure information, but if not, the method 600 can repeat at block 605 to determine whether to give the user another chance to access the secure information.

Where the language herein includes reference to "at least one of A and B" this language is intended to include the options of only A, only B, as well as a combination of A and B.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the authentication agent) or related data available in the cloud. For example, the authentication agent could execute on a computing system in the cloud and select and transmit the first and second sets of test images to the user device. In such a case, the authentication agent could store the image catalog at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving a request to access secure information from a user device, wherein the request includes a username;

identifying a visual password corresponding to the username;
selecting a first set of test images that contain the visual password, and selecting the first set of test images such that each image in the first set comprises a plurality of common features shared by the test images in the first set, wherein the plurality of common features satisfies a predefined minimum feature threshold;
selecting a second set of test images that does not contain the visual password, wherein the visual password is a displayable feature in the first set of test images;
transmitting the first and second sets of test images to the user device;
receiving indications of user-selected images from the user device; and
permitting the user device to access the secure information when the indications of the user-selected images include all of the first set of test images and none of the second set of test images.

2. The method of claim 1, further comprising, before receiving the request to access the secure information:
transmitting a plurality of candidate visual passwords for selection by the user as the visual password associated with a user account;
receiving a selection of the visual password, wherein the visual password is contained within the plurality of candidate visual passwords; and
mapping the username to the visual password.

3. The method of claim 1, wherein selecting the first and second sets of test images comprises:
indexing into an image catalog to identify test images containing the visual password, wherein the image catalog comprises a plurality of images each comprising multiple features that were identified previously.

4. The method of claim 1, wherein selecting the first and second sets of test images comprises:
generating computer generated images where a first portion of the computer generated images include the visual password and a second portion of the computer generated images do not contain the visual password.

5. The method of claim 1, wherein plurality of common features does not include the visual password.

6. The method of claim 5, wherein selecting the second set of test images comprises:
selecting the second set of test images such that none of the images in the second set of test images contain the plurality of common features in the first set of test images.

7. An authentication system, comprising:
a processor; and
memory containing a program which, when executed by the processor performs an operation, the operation comprising:
receiving a request to access at least one of secure information and a secure location,
identifying a visual password corresponding to the request,
selecting a first set of test images that contain the visual password, and selecting the first set of test images such that each image in the first set comprises a plurality of common features shared by the test images in the first set, wherein the plurality of common features satisfies a predefined minimum feature threshold,
selecting a second set of test images that do not contain the visual password,
transmitting the first and second sets of test images to an external device,
receiving indications of user-selected images from the external device, and
permitting access to at least one of the secure information and the secure location when the indications of the user-selected images includes at least a first predefined minimum threshold of the test images in first set and none of the second set of test images.

8. The authentication system of claim 7, further comprising:
an image catalog comprising a plurality of real-world images each comprising multiple features that were identified previously,
wherein selecting the first and second sets of test images comprising:
indexing into the image catalog to identify real-world images containing the visual password and real-world images that do not contain the visual password.

9. The authentication system of claim 7, wherein selecting the first and second sets of test images comprises:
generating computer generated images where a first portion of the computer generated images include the visual password and a second portion of the computer generated images do not contain the visual password.

10. The authentication system of claim 7, wherein the plurality of common features does not include the visual password.

11. The authentication system of claim 10, wherein selecting the second set of test images comprises:
selecting the second set of test images such that none of the images in the second set of test images contain the plurality of common features in the first set of test images.

12. The authentication system of claim 7, wherein selecting the first and second sets of test images comprises:
selecting the first and second sets of test images such that the test images in the first set have at least a predefined number of features in common with the test images in the second set.

13. The authentication system of claim 7, wherein the operation further comprises:
denying access to at least one of the secure information and the secure location when the user-selected images at least one of (i) does not include the first predefined minimum threshold of the first set of test images and (ii) at least one of the second set of test images;
determining that a number of requests associated with a user of the visual password is below a maximum attempt threshold;
selecting a third set of test images that contain the visual password and a fourth set of test images that do not contain the visual password; and
transmitting the third and fourth sets of test images to test the user.

14. The authentication system of claim 13, wherein the operation further comprises:
determining, before selecting the third and fourth sets of test images, that the user-selected images did not include any of the second set of test images and a second predefined minimum threshold of the first set of test images, wherein the second predefined minimum threshold is less than the first predefined minimum threshold.

15. A method, comprising:
receiving a request to access at least one of secure information and a secure location;
identifying a visual password corresponding to the request;
selecting a first set of test images that contains the visual password, and selecting the first set of test images such that each image in the first set comprises a plurality of common features shared by the test images in the first set, wherein the plurality of common features satisfies a predefined minimum feature threshold, selecting a second set of test images that do not contain the visual password;

transmitting the first and second sets of test images to an external device;

receiving an indication of user-selected images from the external device; and determining whether the user-selected images includes at least a first predefined minimum threshold of the first set of test images and none of the second set of test images.

16. The method of claim 15, wherein selecting the first and second sets of test images comprises at least one of:

indexing into an image catalog to identify real-world images containing the visual password and real-world images that do not contain the visual password; and generating computer generated images where a first portion of the computer generated images include the visual password and a second portion of the computer generated images do not contain the visual password.

17. The method of claim 15, wherein the plurality of common features does not include the visual password, wherein selecting the second set of test images comprises:

selecting the second set of test images such that none of the test images in the second set contain the plurality of common features in the first set of test images.

18. The method of claim 15, further comprising:

denying access to at least one of the secure information and the secure location when the user-selected images at least one of (i) does not include the first predefined minimum threshold of the first set of test images and (ii) at least one of the second set of test images;

determining that a number of requests associated with a user of the visual password is below a maximum attempt threshold;

selecting a third set of test images that contain the visual password and a fourth set of test images that do not contain the visual password; and transmitting the third and fourth sets of test images to test the user.

19. The method of claim 18, further comprising:

determining, before selecting the third and fourth sets of test images, that the user-selected images did not include any of the second set of test images and a second predefined minimum threshold of the first set of test images, wherein the second predefined minimum threshold is less than the first predefined minimum threshold.

20. The method of claim 18, further comprising:

instructing the external device receiving the first, second, third, and fourth sets of images to enlarge the test images in the third and fourth sets relative to a size of the test images in the first and second sets when being displayed.

* * * * *